United States Patent
Arikuma

(10) Patent No.: US 8,972,356 B2
(45) Date of Patent: Mar. 3, 2015

(54) DEVICE, SYSTEM, METHOD AND PROGRAM FOR DATA INTEGRATION PROCESS

(75) Inventor: Takeshi Arikuma, Tokyo (JP)

(73) Assignee: NEC Corporation, Tokyo (JP)

(*) Notice: Subject to any disclaimer, the term of this patent is extended or adjusted under 35 U.S.C. 154(b) by 154 days.

(21) Appl. No.: 13/805,398

(22) PCT Filed: Sep. 13, 2011

(86) PCT No.: PCT/JP2011/005129
§ 371 (c)(1),
(2), (4) Date: Dec. 19, 2012

(87) PCT Pub. No.: WO2012/035754
PCT Pub. Date: Mar. 22, 2012

(65) Prior Publication Data
US 2013/0091095 A1 Apr. 11, 2013

(30) Foreign Application Priority Data
Sep. 13, 2010 (JP) .................................. 2010-204210

(51) Int. Cl.
G06F 7/00 (2006.01)
G06F 17/00 (2006.01)
G06F 17/30 (2006.01)

(52) U.S. Cl.
CPC .... *G06F 17/30575* (2013.01); *G06F 17/30958* (2013.01); *G06F 17/30557* (2013.01)
USPC ........... 707/687; 707/690; 707/791; 707/797; 707/798; 707/802

(58) Field of Classification Search
USPC .................. 707/687, 690, 791, 797, 798, 802
See application file for complete search history.

(56) References Cited

U.S. PATENT DOCUMENTS

| 2008/0082574 A1 | 4/2008 | Hosokawa |
| 2010/0057699 A1* | 3/2010 | Sridhar et al. ........... 707/4 |
| 2010/0121885 A1 | 5/2010 | Hosomi et al. |

FOREIGN PATENT DOCUMENTS

| JP | 05-204647 A | 8/1993 |
| JP | 2001-014166 A | 1/2001 |
| JP | 2005-352874 A | 12/2005 |
| JP | 2008-084114 A | 4/2008 |
| WO | 2008/146807 A1 | 12/2008 |

OTHER PUBLICATIONS

Graham Klyne et al., "RDF Concepts and Abstract Syntax", W3C Recommendation, http://www.w3.org/TR/2004/REC-rd-concepts-20040210/ (2004), pp. 1-12.
International Search Report of PCT/JP2011/005129 dated Dec. 13, 2011.

* cited by examiner

Primary Examiner — Hares Jami
(74) Attorney, Agent, or Firm — Sughrue Mion, PLLC

(57) ABSTRACT

A data integration processing device configured to integrate a plurality of graphs includes: an integration processing method selecting means 4 for selecting an integration processing method used for integration of inputted graphs; and an integration process executing means 6, having a plurality of integration processing methods, for integrating a plurality of graphs by executing an integration process in accordance with an integration processing method selected by the integration processing method selecting means 4 from among the plurality of integration processing methods. The integration processing method selecting means 4, with respect to each of nodes in inputted graphs, selects an integration processing method used for integrating lower nodes in accordance with frequency that the lower nodes are consistent, when upper nodes are consistent.

10 Claims, 12 Drawing Sheets

Fig.2

510 : CONSISTENT OVERLAP FREQUENCY TABLE

| ANALYZING MEANS \ ANALYZING MEANS | EMPLOYEE INFORMATION SEARCH ENGINE | CUSTOMER INFORMATION SEARCH ENGINE | PERSON'S TRAJECTORY SEARCH ENGINE |
|---|---|---|---|
| EMPLOYEE INFORMATION SEARCH ENGINE | | Name(90%) | Person(100%) |
| CUSTOMER INFORMATION SEARCH ENGINE | | | - |

Fig.3

520 : INCONSISTENT OVERLAP FREQUENCY TABLE

| ANALYZING MEANS \ ANALYZING MEANS | EMPLOYEE INFORMATION SEARCH ENGINE | CUSTOMER INFORMATION SEARCH ENGINE | PERSON'S TRAJECTORY SEARCH ENGINE |
|---|---|---|---|
| EMPLOYEE INFORMATION SEARCH ENGINE | | e-mail(80%) | - |
| CUSTOMER INFORMATION SEARCH ENGINE | | | - |

Fig.4

530: CLASS PROPERTY APPEARANCE FREQUENCY TABLE

| ANALYZING MEANS ID (531) | CLASS/PROPERTY ID (532) | FREQUENCY (533) |
|---|---|---|
| EMPLOYEE INFORMATION SEARCH ENGINE | Person | 33% |
| EMPLOYEE INFORMATION SEARCH ENGINE | e-mail | 33% |
| CUSTOMER INFORMATION SEARCH ENGINE | Person | 33% |
| CUSTOMER INFORMATION SEARCH ENGINE | e-mail | 12% |
| ⋮ | ⋮ | ⋮ |

Fig.5

810: SELECTION RULE TABLE

| SELECTION RULE ID (811) | RULE (812) | INTEGRATION PROCESSING METHOD ID (813) |
|---|---|---|
| 001 | CONSISTENT OVERLAP FREQUENCY * APPEARANCE FREQUENCY > 0.3 ∧ INCONSISTENT OVERLAP FREQUENCY * APPEARANCE FREQUENCY <= 0.1 | FIRST INTEGRATION PROCESSING METHOD |
| 002 | CONSISTENT OVERLAP FREQUENCY * APPEARANCE FREQUENCY <= 0.3 ∧ INCONSISTENT OVERLAP FREQUENCY * APPEARANCE FREQUENCY > 0.1 | SECOND INTEGRATION PROCESSING METHOD |

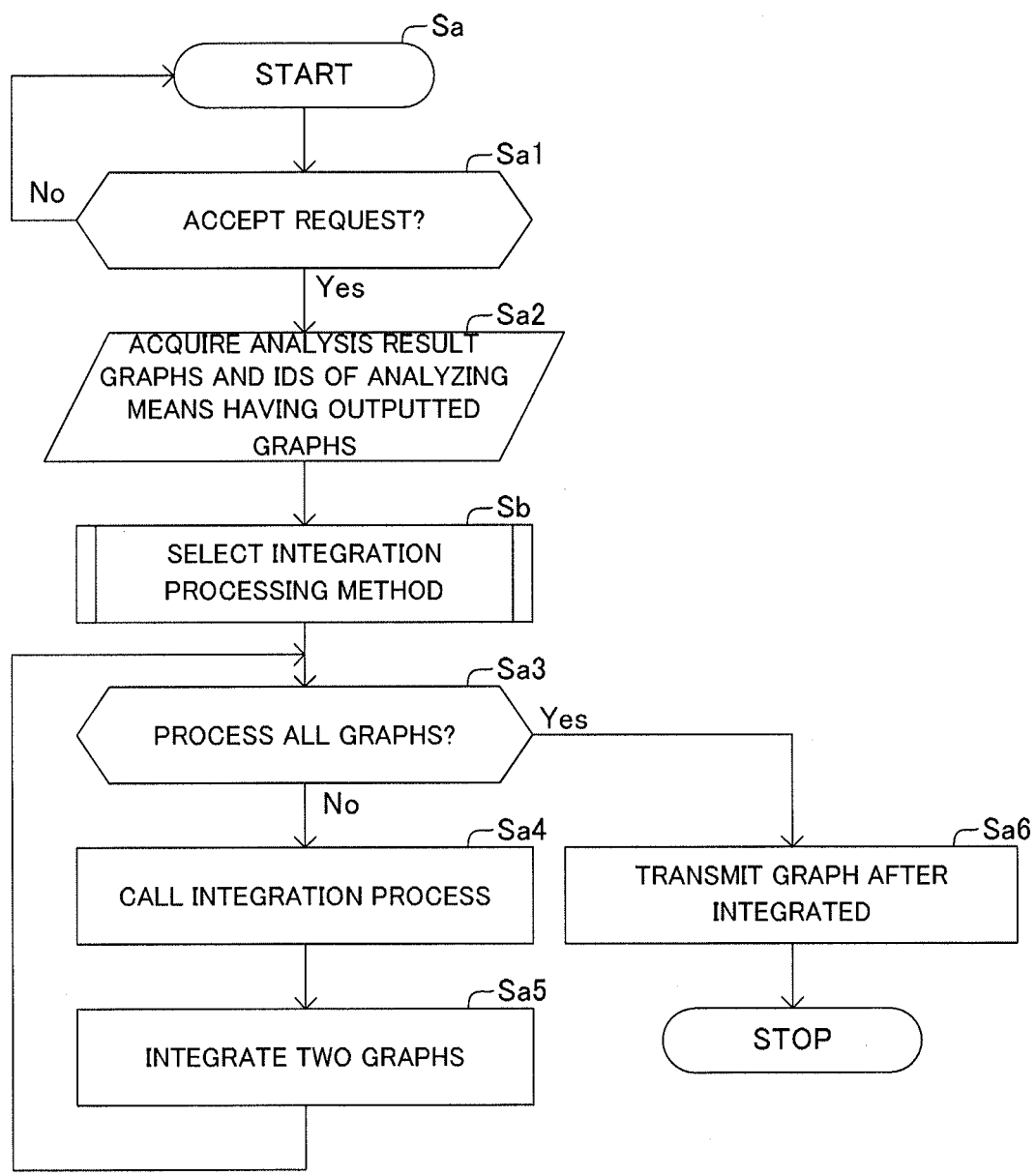

Fig.12
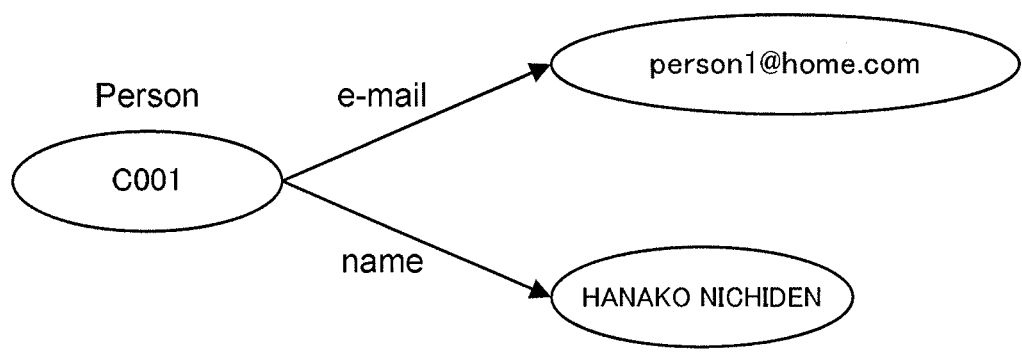
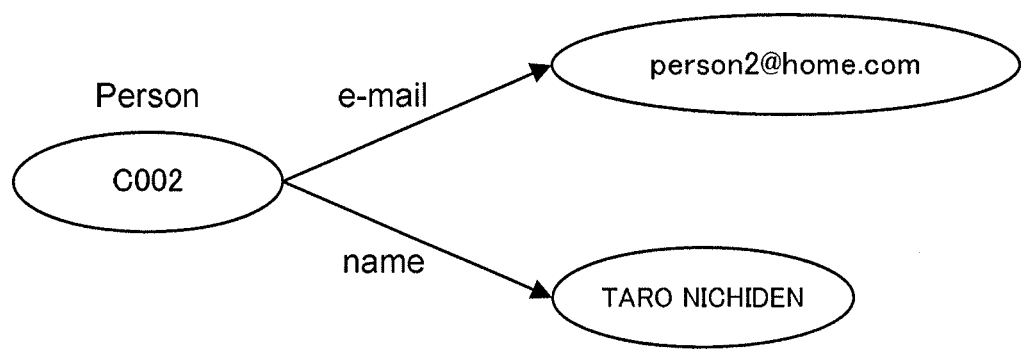

Fig.13
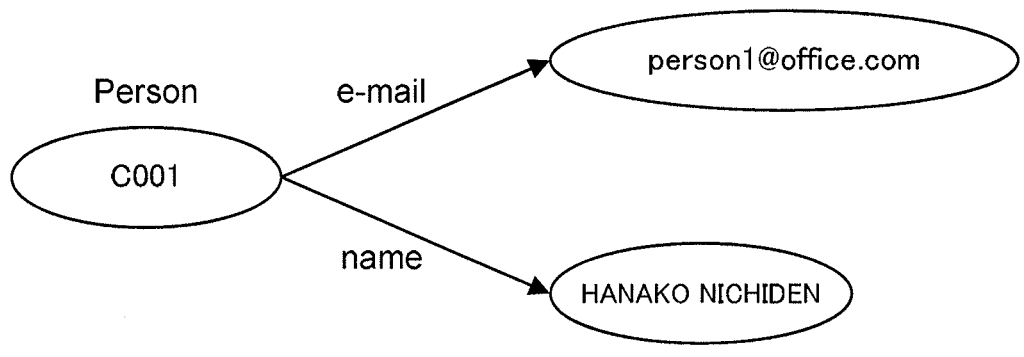
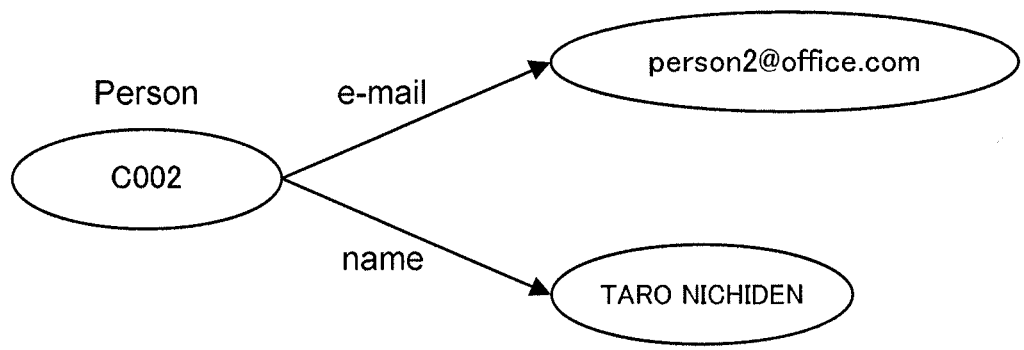

DEVICE, SYSTEM, METHOD AND PROGRAM FOR DATA INTEGRATION PROCESS

CROSS REFERENCE TO RELATED APPLICATIONS

This application is a National Stage of International Application No. PCT/JP2011/005129 filed Sep. 13, 2011, claiming priority based on Japanese Patent Application No. 2010-204210 filed Sep. 13, 2010, the contents of all of which are incorporated herein by reference in their entirety.

TECHNICAL FIELD

The present invention relates to a data integration processing device configured to integrate a plurality of graphs, a data integration processing system, a data integration processing method, and a data integration processing program.

BACKGROUND ART

As a data integration technique, systems described in Patent Document 1 and Non-Patent Document 1 are known.

First, as shown in FIG. 15, a digraph unifying device described in Patent Document 1 includes an expressing means 13, a merging means 14, and a tag checking means 15. The digraph unifying device with such a configuration integrates digraphs in the following manner.

First, the expressing means 13 expresses an inputted digraph as a list of pairs composed of tags and partial digraphs corresponding thereto. This list is referred to as a tag list. Next, the merging means 14 merges tag lists corresponding to two digraphs.

Next, the tag checking means 15 checks whether partial digraphs corresponding to tags having the same name in the merged tag list are identical or not.

Further, in a graph integration algorithm described in Non-Patent Document 1, by using a rule for judgment of an identical node between two graphs, which is externally defined as a map function, integration is performed while consistency between the graphs is judged by the following algorithm.

Map M maps a blank node to a blank node.

With respect to all specific values (RDF literal) lit as nodes of Graph G, M(lit)=lit.

With respect to all intermediate nodes (RDF URI reference) uri as nodes of G, M(uri)=uri.

In a case that a triple (s, p, o) showing that a node and a node are connected by an edge is within G, a triple (M(s), p, M(o)) is within G' always in this case.

The graph integration process is performed based on consistency or inconsistency of each triple by the algorithm described above.

[Patent Document 1] Japanese Unexamined Patent Application Publication No. 5-204647

[Non-Patent Document 1] Graham Klyne et al., "RDF Concepts and Abstract Syntax," W3C Recommendation, www.w3.org/TR/2004/REC-rdf-concepts-20040210/, (2004)

A problem regarding the abovementioned techniques is a tradeoff between an integration function and throughput. An existing integrating means realizes the process at [the number of nodes in a graph]$^2$ by simplifying an integration function to be provided as in the method described in Patent Document 1.

On the other hand, as in the method described in Non-Patent Document 1, in a method for providing an advanced integration function of judging the identity of triples based on peripheral information of nodes and synonym information registered in a map, a processing time at a processing speed of ([the number of nodes in a graph]×[the average number of properties per node])$^2$ is required. Therefore, the existing techniques have a problem that it is impossible to seek both an integration process and throughput.

SUMMARY

Accordingly, an object of the present invention is to provide a data integration processing device capable of realizing high throughput while keeping restriction on an integration function to be provided low, a data integration processing system, a data integration processing method, and a data integration processing program.

A data integration processing device according to the present invention is a data integration processing device configured to integrate a plurality of graphs, and the data integration processing device includes:

an integration processing method selecting means for selecting an integration processing method used for integration of inputted graphs; and an integration process executing means, having a plurality of integration processing methods, for integrating a plurality of graphs by executing an integration process in accordance with an integration processing method selected by the integration processing method selecting means from among the plurality of integration processing methods.

The integration processing method selecting means is configured to, with respect to each of nodes in inputted graphs, select an integration processing method used for integrating lower nodes in accordance with frequency that the lower nodes are consistent, when upper nodes are consistent.

A data integration processing system according to the present invention is a data integration processing system configured to integrate a plurality of graphs, and the data integration processing system includes:

an integration processing method selecting means for selecting an integration processing method used for integration of inputted graphs; and an integration process executing means, having a plurality of integration processing methods, for integrating a plurality of graphs by executing an integration process in accordance with an integration processing method selected by the integration processing method selecting means from among the plurality of integration processing methods.

The integration processing method selecting means is configured to, with respect to each of nodes in inputted graphs, select an integration processing method used for integrating lower nodes in accordance with frequency that the lower nodes are consistent, when upper nodes are consistent.

A data integration processing method according to the present invention is a data integration processing method for integrating a plurality of graphs, and the data integration processing method includes:

selecting an integration processing method used for integration of inputted graphs;

having a plurality of integration processing methods and integrating a plurality of graphs by executing an integration process in accordance with an integration processing method selected from among the plurality of integration processing methods; and at the time of selecting an integration processing method, with respect to each of nodes in inputted graphs, selecting an integration processing method used for integrating lower nodes in accordance with frequency that the lower nodes are consistent, when upper nodes are consistent.

A data integration processing program according to the present invention is a data integration processing program for integrating a plurality of graphs, and the data integration processing program includes instructions for causing a computer to execute:

an integration processing method selecting process for selecting an integration processing method used for integration of inputted graphs; and an integration process executing process, having a plurality of integration processing methods, for integrating a plurality of graphs by executing an integration process in accordance with an integration processing method selected from among the plurality of integration processing methods.

The data integration processing program includes instructions for causing the computer to, in the integration processing method selecting process, execute a process for, with respect to each of nodes in inputted graphs, selecting an integration processing method used for integrating lower nodes in accordance with frequency that the lower nodes are consistent, when upper nodes are consistent.

According to the present invention, it is possible to realize high throughput while keeping restriction on an integration function to be provided low.

BRIEF DESCRIPTION OF DRAWINGS

FIG. 2 is a conceptual view showing an example of a data structure of a consistent overlap frequency table stored by an each-analyzing-means characteristic storing means included in the data integration processing system;

FIG. 3 is a conceptual view showing an example of a data structure of an inconsistent overlap frequency table stored by the each-analyzing-means characteristic storing means included in the data integration processing system;

FIG. 4 is a conceptual view showing an example of a data structure of a class property appearance frequency table stored by the each-analyzing-means characteristic storing means included in the data integration processing system;

FIG. 5 is a conceptual view showing an example of a data structure of a selection rule table stored by an integration processing method selection rule storing means included in the data integration processing system;

FIG. 6 is a flowchart showing an example of a flow of a data integration process executed by the data integration processing system;

FIG. 12 is a conceptual view showing an example of a model outputted by a customer information search engine in the exemplary embodiments of the present invention;

FIG. 13 is a conceptual view showing an example of a model outputted by an employee information search engine;

EXEMPLARY EMBODIMENTS

First Exemplary Embodiment

Figure 1:
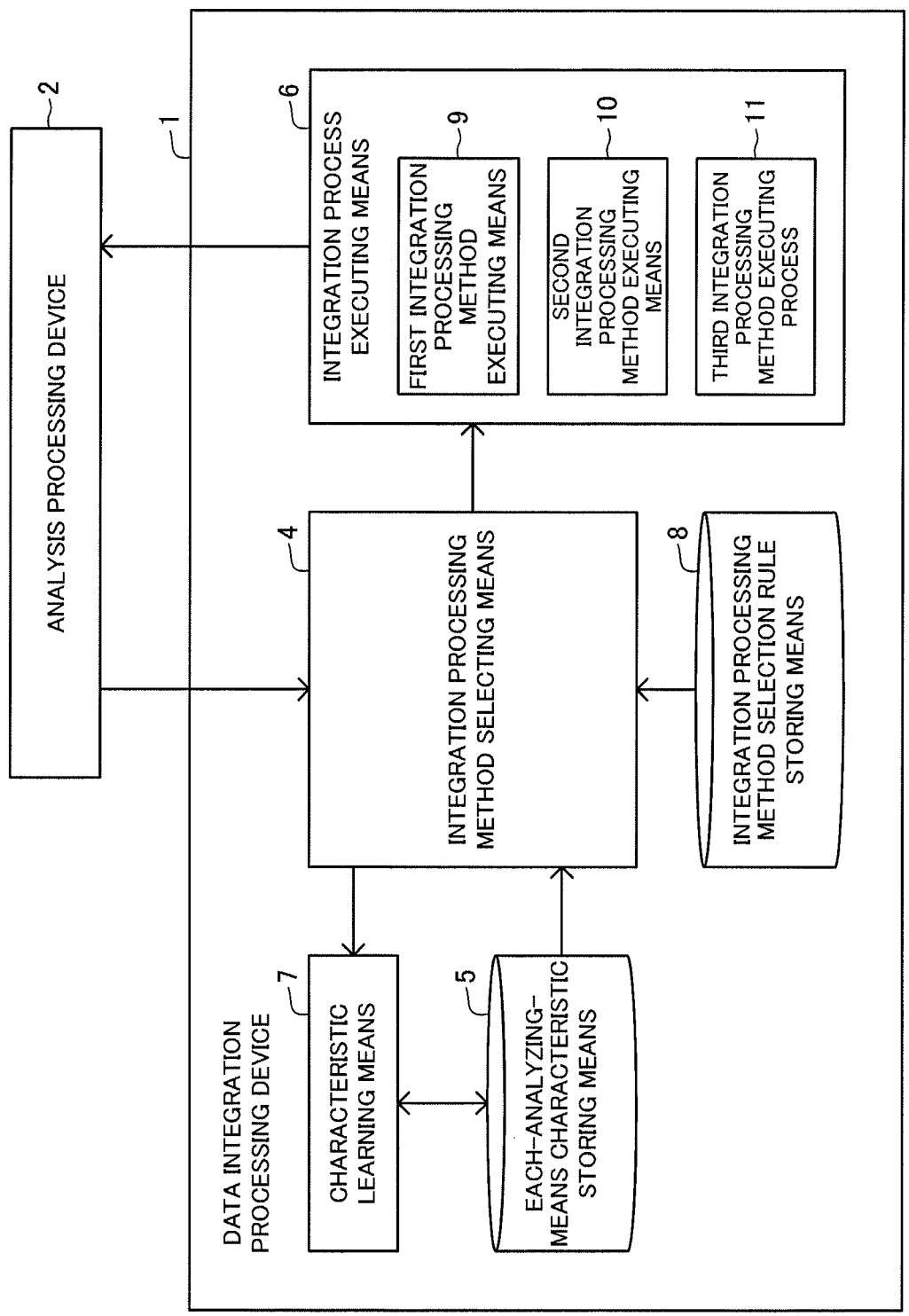
FIG. 1 is a function block diagram showing an example of a whole configuration of a first exemplary embodiment of a data integration processing system according to the present invention.

Next, a first exemplary embodiment of the present invention will be described in detail with reference to the drawings. FIG. 1 is a function block diagram showing an example of the whole configuration of the first exemplary embodiment of a data integration processing system according to the present invention. As shown in FIG. 1, the data integration processing system includes a data integration processing device 1 and an analysis processing device 2. In an example described in this exemplary embodiment, the data integration processing device 1 and the analysis processing device 2 are configured by different devices, but are not limited thereto and may be configured by a single device.

To be specific, the analysis processing device 2 is realized by an information processing device such as a personal computer operating in accordance with a program. The analysis processing device 2 includes a plurality of analyzing means (not shown) for analyzing data.

To be specific, the data integration processing device 1 is realized by an information processing device such as a personal computer operating in accordance with a program. The data integration processing device 1 includes an each-analyzing-means characteristic storing means 5, an integration processing method selection rule storing means 8, an integration processing method selecting means 4, an integration process executing means 6, and a characteristic learning means 7. The respective means are controlled by an integration controlling means (not shown).

The each-analyzing-means characteristic storing means 5 stores characteristic information of subgraphs in a graph expressing an analysis result, for each of the analyzing means included by the analysis processing device 2. To be specific, the each-analyzing-means characteristic storing means 5 is realized by a storage device such as an optical disk device and a magnetic disk device.

The integration processing method selection rule storing means 8 stores rule information (e.g., a selection rule table 810, and so on) showing a rule for selecting an optimum integration processing method for graph data. To be specific, the integration processing method selection rule storing means 8 is realized by a storage device such as an optical disk device and a magnetic disk device.

The integration processing method selecting means 4 has a function of receiving graphs expressing analysis results and information of a group of analyzing means having outputted the graphs, from the analysis processing device 2, and selecting a suitable integration processing method based on the characteristic information stored by the each-analyzing-means characteristic storing means 5 and the rule information stored by the integration processing method selection rule storing means 8. To be specific, the integration processing method selecting means 4 is realized by a CPU of an information processing device operating in accordance with a program.

The integration process executing means 6 has a function of performing integration of the graphs by executing an integration process in accordance with the integration processing method selected by the integration processing method selecting means 4 and transmitting the result to the analysis processing device 2. To be specific, the integration process executing means 6 is realized by a CPU of an information processing device operating in accordance with a program.

Further, the integration process executing means 6 includes a first integration processing method executing means 9, a second integration processing method executing means 10 and a third integration processing method executing means 11 that execute a process of integrating the graphs by different methods. In an example described in this exemplary embodiment, the number of the included integration processing method executing means is three, but not limited thereto and can be any number of two or more. Moreover, the respective integration processing method executing means are realized by execution of the process by a CPU of an information processing device based on an existing graph integration algorithm, for example.

The characteristic learning means 7 has a function of receiving graphs and information of a group of analyzing means having outputted the graphs, from the integration processing method selecting means 4, and updating information stored by the each-analyzing-means characteristic storing means 5. To be specific, the characteristic learning means 7 is realized by a CPU of an information processing device operating in accordance with a program.

The each-analyzing-means characteristic storing means 5 stores a consistent overlap frequency table 510, an inconsistent overlap frequency table 520, and a class property appearance frequency table 530.

As shown in FIG. 2, the consistent overlap frequency table 510 takes the IDs of the analyzing means included by the analysis processing device 2 on the ordinate and on the abscissa. A method for expressing the ID of the analyzing means does not need to be limited to use of a number, and can be any expression that allows unique specification of the analyzing means, such as a string or a URI.

Each cell within the consistent overlap frequency table 510 stores a part where consistent overlap occurs in the analysis results respectively outputted by the two analyzing means associated with the analyzing means IDs on the ordinate and the abscissa of the cell and also the frequency thereof. That is to say, each cell stores a part where lower nodes are consistent and the frequency thereof when upper nodes are consistent, with respect to each of nodes in the graphs outputted by the two analyzing means. Herein, it is referred to as consistent overlap that, with respect to the two graphs, when element data of the analysis results are overlapped, information configuring the element data are consistent. As expression of a part where consistent overlap occurs, it is possible to use a class of a node of graph data to be processed, or a property name as a label of an edge of the graph data.

As shown in FIG. 3, the inconsistent overlap frequency table 520 takes IDs of the analyzing means included by the analysis processing device 2 on the ordinate and on the abscissa. A method for expressing the ID of the analyzing means does not need to be limited to use of a number, and can be any expression that allows unique specification of the analyzing means, such as a string or a URI.

Each cell within the inconsistent overlap frequency table 520 stores a part where inconsistent overlap occurs in the analysis results respectively outputted by the two analyzing means associated with the analyzing means IDs on the ordinate and the abscissa of the cell and also the frequency thereof. That is to say, each cell stores a part where lower nodes are not overlapped though upper nodes are overlapped and also the frequency thereof, with respect to each of nodes in the graphs outputted by the two analyzing means. Herein, it is referred to as inconsistent overlap that, with respect to the two graphs, when element data of the analysis results are overlapped, information configuring the element data are different. As expression of a part where inconsistent overlap occurs, it is possible to use a class of a node of graph data to be processed, or a property name as a label of an edge of the graph data.

As shown in FIG. 4, the class property appearance frequency table 530 stores an analyzing means ID 531, a class/property ID 532, and a frequency 533.

The analyzing means ID 531 is used for uniquely specifying the analyzing means included by the analysis processing device 2, in a like manner as the consistent overlap frequency table 510 and the inconsistent overlap frequency table 520.

Further, the class/property ID 532 is used for uniquely specifying a class and a property included in data in the graph of the analysis result. Here, a method for expressing the class/property ID 532 does not need to be limited to an English letters, and can be any expression that allows unique specification of a class and a property, such as any string or URI.

The frequency 533 is a value of the appearance frequency of a class or property specified by the class/property ID 532 when all classes or properties included in the graph outputted as the analysis result by the analyzing means specified by the analyzing means ID 531 is a parameter. As a method of expressing the frequency 533, it is not necessary to limit to expression in percentage, and it is possible to use any numerical expression.

The integration processing method selection rule storing means 8 stores a selection rule table 810. As shown in FIG. 5, the selection rule table 810 stores a selection rule ID 811, a rule 812, and an integration processing method ID 813.

The selection rule ID 811 is an ID for uniquely identifying a selection rule, and a main key of the selection rule table 810. As a method of expressing the selection rule ID 811, it is not necessary to limit to a number, and it is possible to use any expression, such as any string or URI, that allows unique specification of a selection rule.

The rule 812 is used for selecting an integration processing method. In a case that inputted data matches a condition included in the rule 812, an integration processing method to be used is designated with the integration processing method ID 813 associated with the rule 812.

In the rule 812, for example, rules such as "select a low-function and high-speed integration processing speed when consistent overlap frequency is high and inconsistent overlap frequency is low" and "select a high-function integration processing speed when consistent overlap frequency is low and inconsistent overlap frequency is high" are written. Other examples of the rules may be rules such as "select a low-function and high-speed integration processing method when a value based on consistent overlap frequency is higher than a predetermined value" and "select a high-function and low-speed integration processing speed when a value based on consistent overlap frequency is lower than a predetermined value," or may be rules such as "select a low-function and high-speed integration processing method when a value based on consistent overlap frequency is higher than a predetermined value and a value based on inconsistent overlap frequency is lower than a predetermined value" and "select a high-function integration processing method when a value based on consistent overlap frequency is lower than a predetermined value and a value based on inconsistent overlap frequency is higher than a predetermined value." For example, the rules shown in FIG. 5 are rules such as "select a low-function and high-speed integration processing method when a value as the result of multiplying consistent overlap frequency by appearance frequency described later is higher than a predetermined value and a value as the result of multiplying inconsistent overlap frequency by appearance frequency described later is equal to or less than a predetermined value" and "select a high-function integration processing method when a value as the result of multiplying consistent overlap frequency by appearance frequency described later is equal to or less than a predetermined value and a value as the result of multiplying inconsistent overlap frequency by appearance frequency described later is higher than a predetermined value." As a method of writing the rule 812, it is not necessary to limit to a logical formula, and it is possible to use writing such as a decision tree.

The integration processing method ID is used for uniquely specifying an integration processing method (to be specific, an integration processing method executing means (9 to 11)). As a method of expressing an integration processing method ID, it is not necessary to limit to a string, and it is possible to use any expression, such as any string or URI, that allows unique specification of an integration processing method.

Next, an example of an operation of the first exemplary embodiment of the data integration processing system will be described.

The data integration processing system of the first exemplary embodiment executes a data integration process Sa, an integration processing method selection process Sb, and a characteristic learning process Sc.

In the data integration process Sa, the data integration processing system executes a series of integration processes in response to a request by the analysis processing device 2, and returns the result of the integration process.

Further, in the integration processing method selection process Sb, the integration processing method selecting means 4 selects optimum integration processing methods for graphs to be integrated.

Further, in the characteristic learning process Sc, the characteristic leaning means 7 receives graphs to be integrated and information of a group of analyzing means having outputted the graphs from the integration processing method selecting means 4, and updates the information stored by the each-analyzing-means characteristic storing means 5.

At first, the data integration process Sa will be described with reference to the drawings. FIG. 6 shows a flowchart showing an example of a flow of the data integration process executed by the data integration processing system.

In the data integration process Sa, firstly, the integration processing method selecting means 4 receives a request for the data integration process from the analysis processing device 2 (step Sa1).

Next, the integration processing method selecting means 4 receives analysis result graphs expressing analysis results and IDs of the analyzing means having outputted the graphs, from the analysis processing device 2 (step Sa2).

Next, the integration processing method selecting means 4 executes an integration processing method selection process (step Sb), and selects integration processing method IDs. The integration processing method selection process (step Sb) will be described in detail later.

Next, the integration processing method selecting means 4 outputs the group of analysis result graphs and the integration processing method IDs to the integration process executing means 6.

Next, with respect to each of all of the analysis result graphs, the integration process executing means 6 extracts an integration processing method ID corresponding to the analysis result graph from the integration processing method IDs, and causes any one of the integration processing method executing means 9 to 11 corresponding to the integration processing method ID to execute a process of integrating two graphs (steps Sa3 to Sa5). To be specific, the integration process executing means 6 extracts an integration processing method ID corresponding to the analysis result graph, and outputs an integration process request to any one of the integration processing method executing means 9 to 11 specified by the extracted integration processing method ID. Then, the integration processing method executing means (any one of 9 to 11) executes a process of integrating two graphs in response to the request.

Finally, the integration process executing means 6 transmits a graph after the integration process to the analysis processing device 2 (step Sa6).

Figure 7:
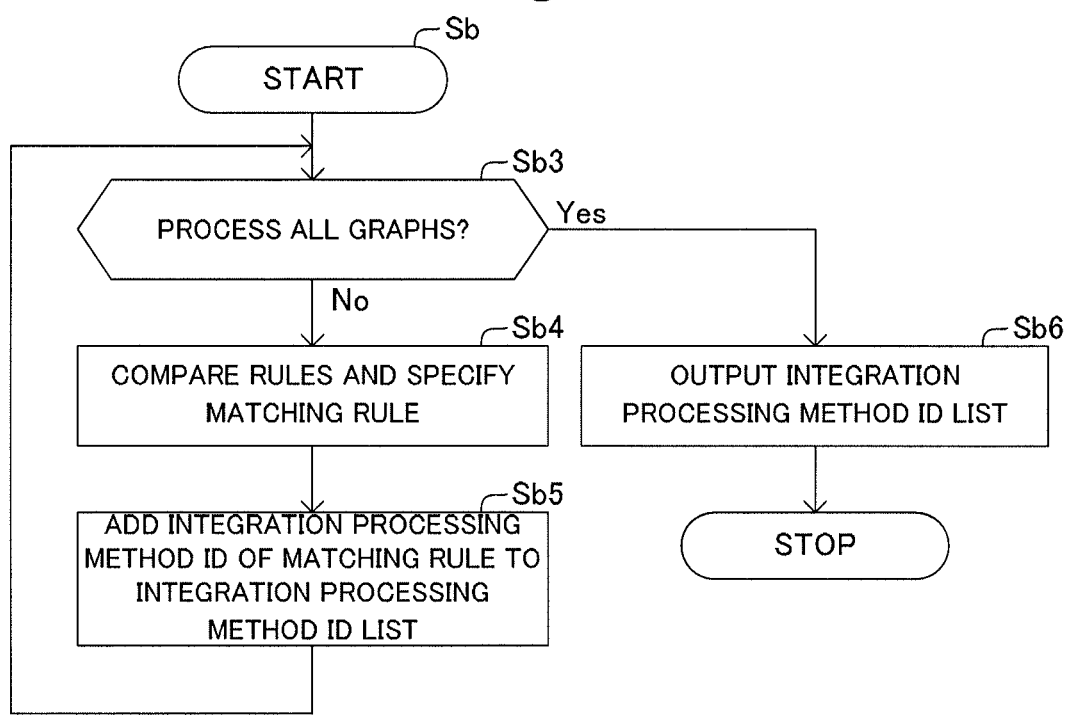
FIG. 7 is a flowchart showing an example of a flow of an integration process selection process executed by the data integration processing system.

Next, the integration processing method selection process Sb will be described by using the drawings. FIG. 7 shows a flowchart of an example of the flow of the integration processing method selection process executed by the data integration processing system.

In the integration processing method selection process Sb, firstly, with respect to each of all of the analysis result graphs and the ID of the analyzing means having outputted the analysis result graph, the integration processing method selecting means 4 extracts corresponding characteristic information from the each-analyzing-means characteristic storing means 5. Then, based on the extracted characteristic information, the integration processing method selecting means 4 specifies a matching rule from the rule information stored by the integration processing method selection rule storing means 8 (step Sb3, step Sb4). To be specific, the integration processing method selecting means 4 specifies a selection rule ID compliant with a condition described in the rule 812, based on consistent overlap frequency and inconsistent overlap frequency and the appearance frequency thereof that are included in the extracted characteristic information.

Next, the integration processing method selecting means 4 acquires the integration processing method ID 813 corresponding to the specified rule from the integration processing method selection rule storing means 8, and keeps it inside (step Sb5). To be specific, the integration processing method selecting means 4 extracts information showing the integration processing method ID 813 corresponding to the specified selection rule ID 811 from the integration processing method selection rule storing means 8, and causes a storing part to temporarily store the extracted information.

Finally, the integration processing method selecting means 4 outputs the integration processing method IDs to the integration controlling means (step Sb6). To be specific, the integration processing method selecting means 4 outputs the information showing the integration processing method IDs having been extracted to the integration controlling means for controlling the respective means of the data integration processing device 1.

Figure 8:
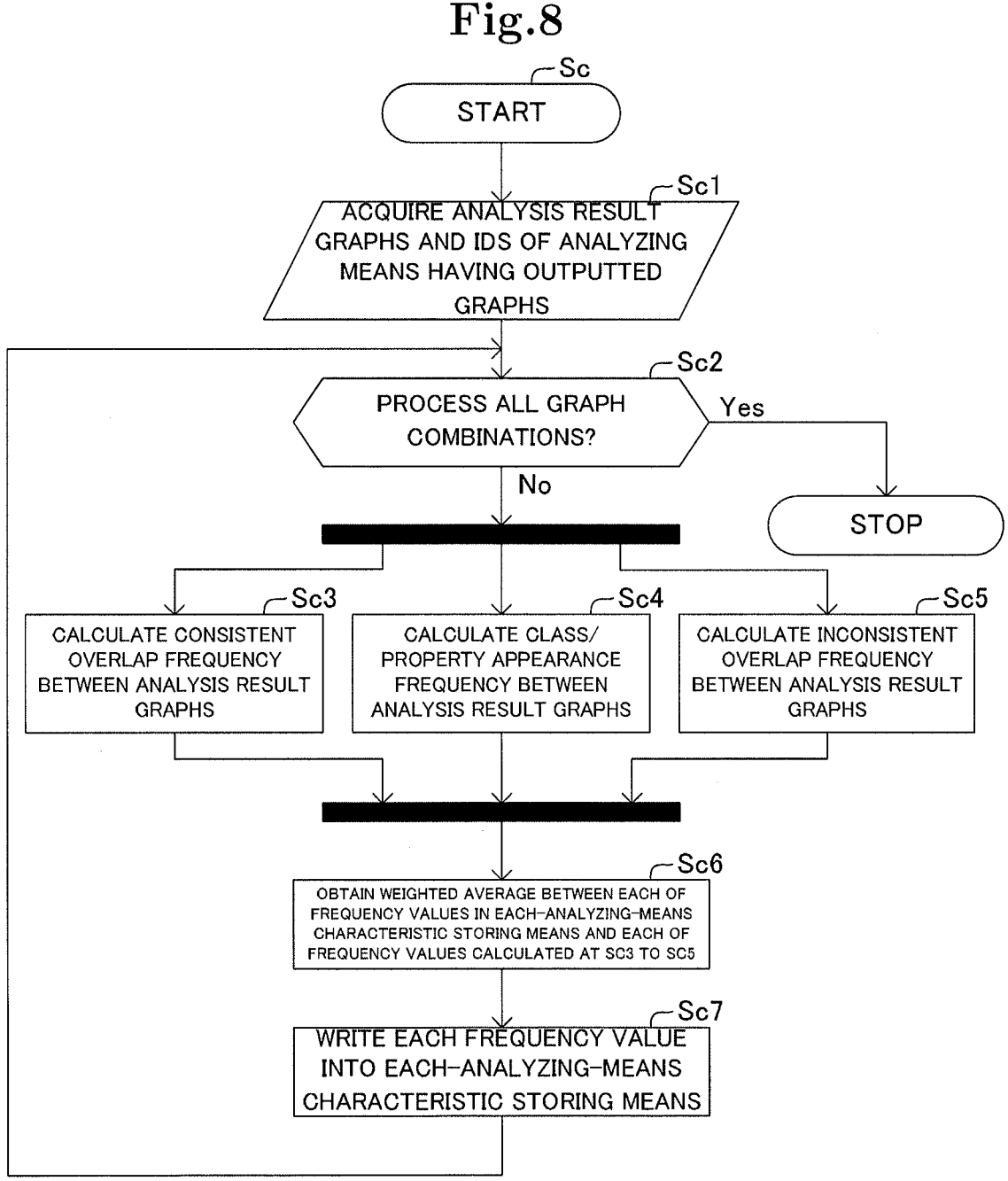
FIG. 8 is a flowchart showing an example of a flow of a characteristic learning process executed by the data integration processing system.

Next, the characteristic learning process Sc will be described in detail by using the drawings. FIG. 8 shows a flowchart showing an example of the flow of the characteristic learning process executed by the data integration processing system.

In the characteristic learning process Sc, firstly, the characteristic learning means 7 receives graphs of analysis results and IDs of analyzing means of the analysis processing device 2 having outputted the graphs, from the integration processing method selecting means 4 (step Sc1).

Next, the characteristic learning means 7 executes the following processes on each of all combinations of pairs of the received graphs (step Sc2).

First, with respect to a pair of graphs, the characteristic learning means 7 calculates consistent overlap frequency between the analysis result graphs (step Sc3).

Next, with respect to the pair of graphs, the characteristic learning means 7 calculates class/property appearance frequency between the analysis result graphs (step Sc4).

Next, with respect to the pair of graphs, the characteristic learning means 7 calculates inconsistent overlap frequency between the analysis result graphs (step Sc5).

Herein, the processes at steps Sc3, Sc4 and Sc5 can be executed in parallel, irrespective of the order of execution.

Next, with respect to each of the frequencies calculated at steps Sc3 to Sc 5, the characteristic learning means 7 extracts information showing corresponding frequency from the each-analyzing-means characteristic storing means 5, and obtains a weighted average for each (step Sc6).

Finally, the characteristic learning means 7 causes the each-analyzing-means storing means 5 to store each frequency value after obtaining of the weighted average (step Sc7).

After executing the processes from step Sc3 to step Sc7 on all of the combinations of graphs, the characteristic learning means 7 ends the learning process (step Sc2). The data integration processing system thus executes the characteristic learning process Sc every predetermined period, thereby updating the characteristic information stored by the each-analyzing-means characteristic storing means 5 as needed.

Next, an effect of this exemplary embodiment will be described.

The effect of this exemplary embodiment is that the integration process is executed by an integration processing method of providing a function required at the time integration of two graphs, and thereby, it is possible to increase the throughput of the integration process without limiting functions.

This is because the integration processing method selecting means 4 selects a suitable integration processing method based on the statistical information between graphs stored by the each-analyzing-means characteristic storing means 5, so that it is possible to prevent improvident application of an advanced process to all graphs and reduce a wasteful process.

Second Exemplary Embodiment

Figure 9:
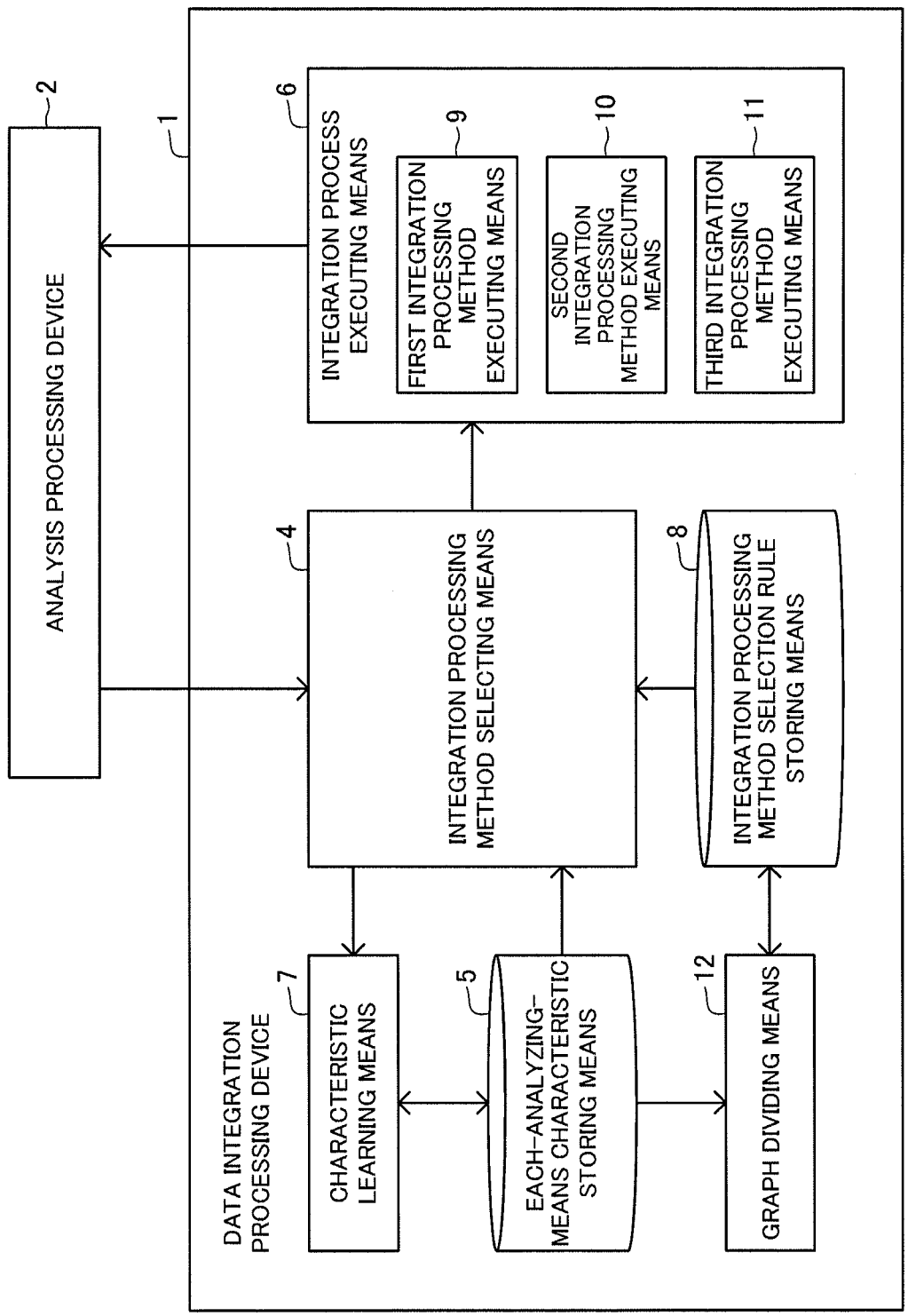
FIG. 9 is a function block diagram showing an example of a whole configuration of a second exemplary embodiment of the data integration processing system.

Next, a second exemplary embodiment of the present invention will be described. FIG. 9 shows a function block diagram showing an example of a whole configuration of the second exemplary embodiment of the data integration processing system.

The data integration processing system of the second exemplary embodiment is different from that of the first exemplary embodiment in that a graph dividing means 12 is included and the graph dividing means 12 divides a graph before integration into subgraphs.

In FIG. 9, the components other than the graph dividing means 12 are the same as those of the first exemplary embodiment. The same components as those of the first exemplary embodiment will be denoted by the same reference numerals as in FIG. 1, and a detailed description thereof will be omitted.

The graph dividing means 12 receives graphs to be integrated and the IDs of the analyzing means having outputted the graphs, from the integration processing method selecting means 4. Then, based on the characteristic information in the each-analyzing-means characteristic storing means 5, the graph dividing means 12 extracts portions showing the same characteristic in the graphs as subgraphs, and divides the graphs to be integrated into subgraphs. To be specific, the graph dividing means 12 is realized by a CPU of an information processing device operating in accordance with a program.

Next, an example of an operation of the second exemplary embodiment will be described.

In this exemplary embodiment, as in the first exemplary embodiment, a data integration process Sd, the integration processing method selection process Sb, and the characteristic learning process Sc are executed. However, this exemplary embodiment is different from the first exemplary embodiment in that a subgraph dividing process Se is executed and the graph dividing means 12 divides an inputted graph into subgraphs in the data integration process Sd.

Because the integration processing method selection process Sb and the characteristic learning process Sc are the same as in the first exemplary embodiment, a detailed description thereof will be omitted.

Figure 10:
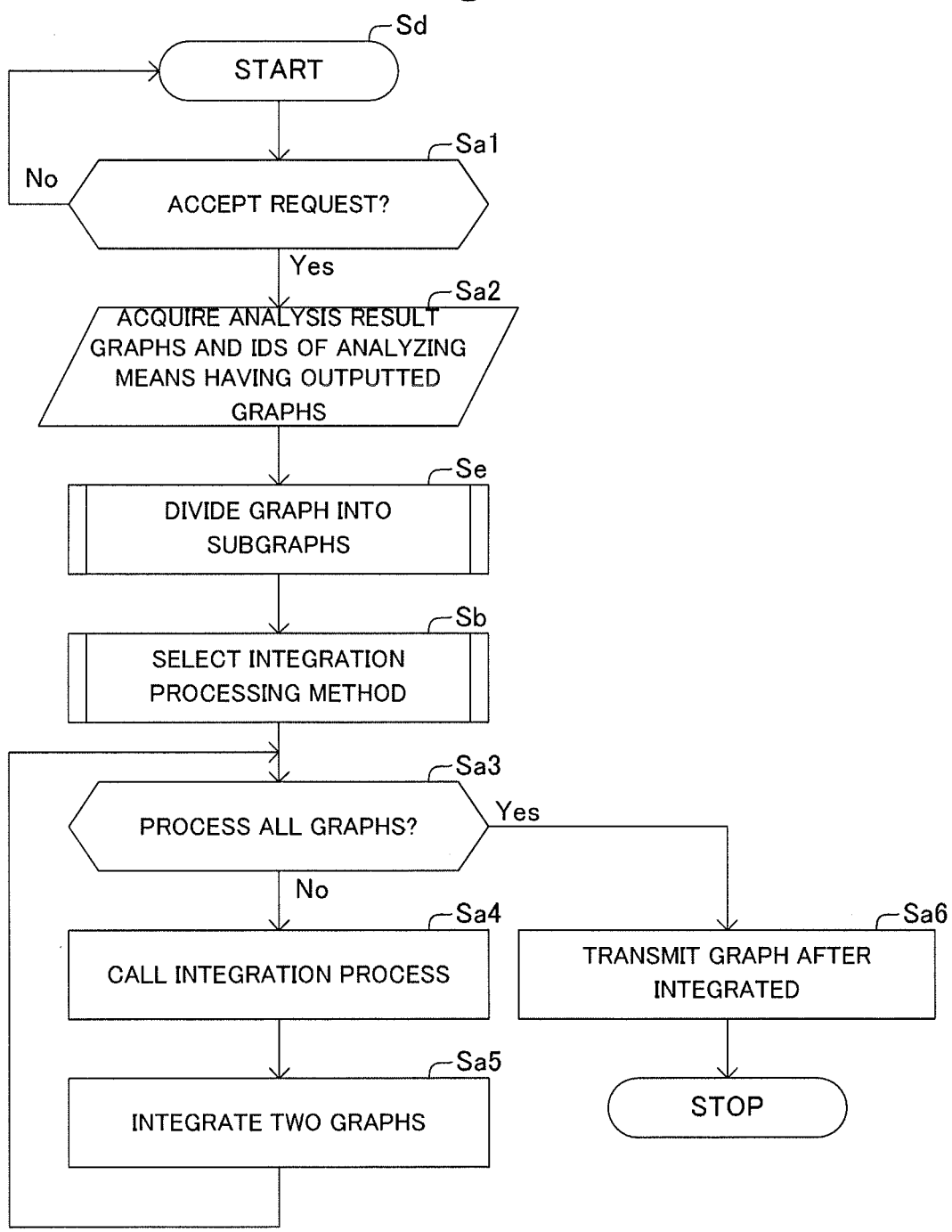
FIG. 10 is a flowchart showing an example of a flow of a data integration process executed by the data integration processing system.

The data integration process Sd will be described by using the drawings. FIG. 10 shows a flowchart showing an example of the flow of the data integration process Sd executed by the data integration processing system. In FIG. 10, the same operation elements as in the first exemplary embodiment will be denoted by the same reference numerals as in FIG. 6, and a detailed description thereof will be omitted.

First, the integration processing method selecting means 4 accepts a request for the data integration process from the analysis processing device 2 (step Sa1).

Next, the integration processing method selecting means 4 receives analysis result graphs expressing analysis results and the IDs of the analyzing means having outputted the graphs, from the analysis processing device 2 (step Sa2).

Next, the integration processing method selecting means 4 outputs the received analysis result graphs and the IDs of the analyzing means having outputted the graphs, to the graph dividing means 12. Then, the graph dividing means 12 divides the graphs into subgraphs (step Se). The details of step Se will be described later.

Because the subsequent processes are the same as those (steps Sb to Sa6) in the first exemplary embodiment, a description thereof will be omitted.

Figure 11:
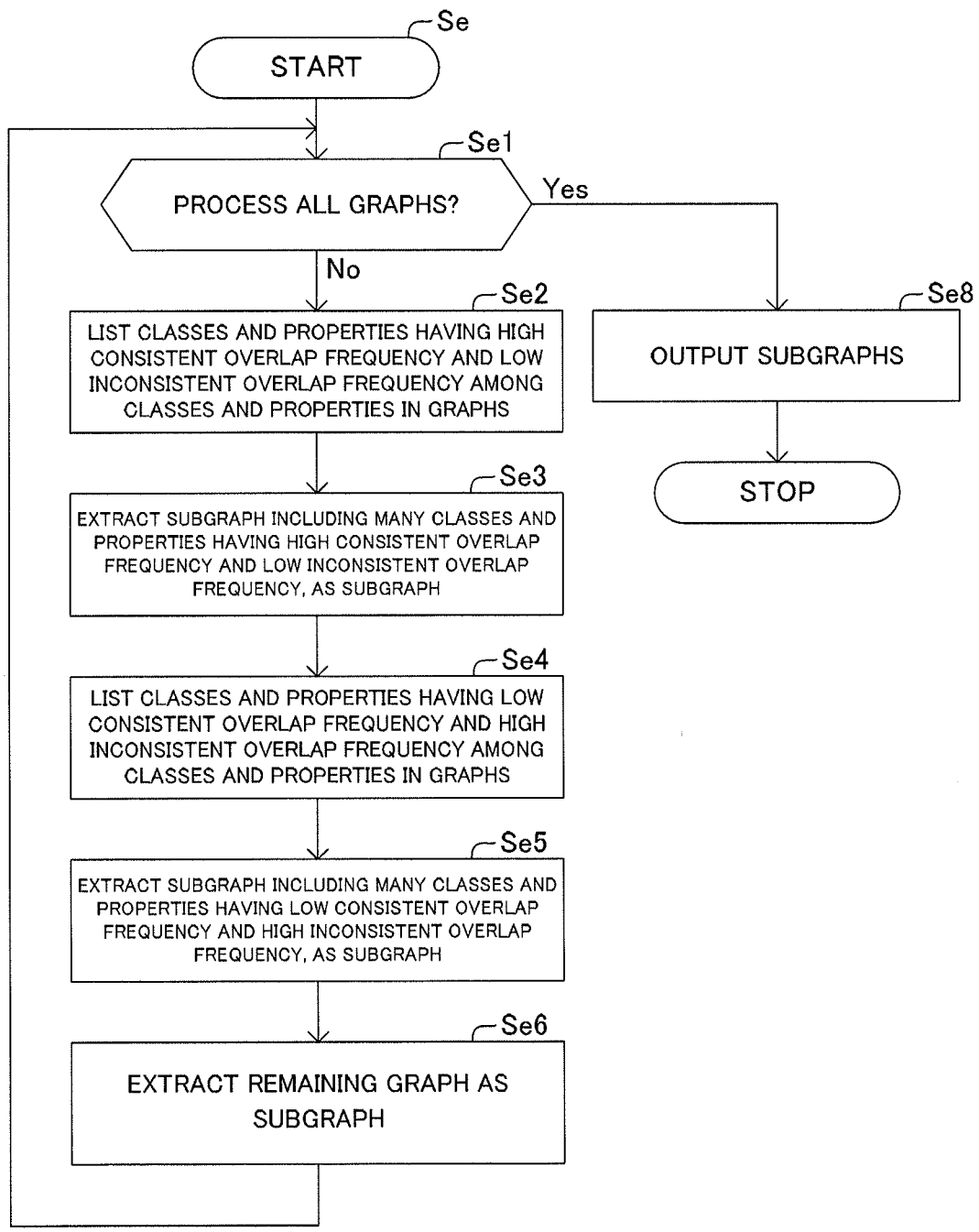
FIG. 11 is a flowchart showing an example of a flow of a graph division process executed by the data integration processing system.

The subgraph dividing process Se will be described by using the drawings. FIG. 11 shows an example of the flow of the subgraph dividing process Se executed by the data integration processing system.

In the subgraph dividing process Se, firstly, the graph dividing means 12 receives analysis result graphs and the IDs of the analyzing means of the analysis processing device 2 having outputted the graphs from the integration processing method selecting means 4, and executes the following processes on all of the graphs (step Se1).

First, with respect to classes and properties included in the graphs, the graph dividing means 12 lists classes and properties having high consistent overlap frequency and low inconsistent overlap frequency from the each-analyzing-means characteristic storing means 5, with reference to the consistent overlap table 510 and the inconsistent overlap table 520 (step Se2).

Next, the graph dividing means 12 extracts a subgraph including a number of classes and properties having high consistent overlap frequency and low inconsistent overlap frequency, as a high-consistency subgraph (step Se3).

Next, with respect to the classes and properties included in the graphs, the graph dividing means 12 lists classes and properties having low consistent overlap frequency and high inconsistent overlap frequency from the each-analyzing-means characteristic storing means 5, with reference to the consistent overlap table 510 and the inconsistent overlap table 520 (step Se4).

Next, the graph dividing means 12 extracts a subgraph including a number of classes and properties having low consistent overlap frequency and high inconsistent overlap frequency, as a high-inconsistency subgraph (step Se5).

Next, the graph dividing means 12 extracts data which is not included either in the high-consistency subgraph or in the high-inconsistency subgraph in the graphs, as a subgraph (step Se6).

Finally, after executing these processes on all of the graphs, the graph dividing means 12 outputs the extracted subgraphs to the integration processing method selecting means 4 (step Se8).

Next, an effect of this exemplary embodiment will be described.

The effect of this exemplary embodiment is that, when the size of a graph becomes large, it is possible to increase the speed of the integration process and shorten the processing time by dividing the graph.

This is because the graph dividing means 12 can divide a graph into subgraphs in which data having similar characteristics are gathered, it is possible to efficiently execute the integration process in accordance with each integration processing method.

Third Exemplary Embodiment

Next, a third exemplary embodiment of the present invention will be described. Herein, the analysis processing device 2 includes analyzing means shown below:

(1) a customer information search engine outputting the e-mail address, address and name of a customer corresponding to an inputted name;

(2) an employee information searching engine outputting the e-mail address, address, name and employee ID of an employee corresponding to an inputted name;

(3) a person's trajectory search engine outputting a movement trajectory in an office of an employee ID.

Figure 14:
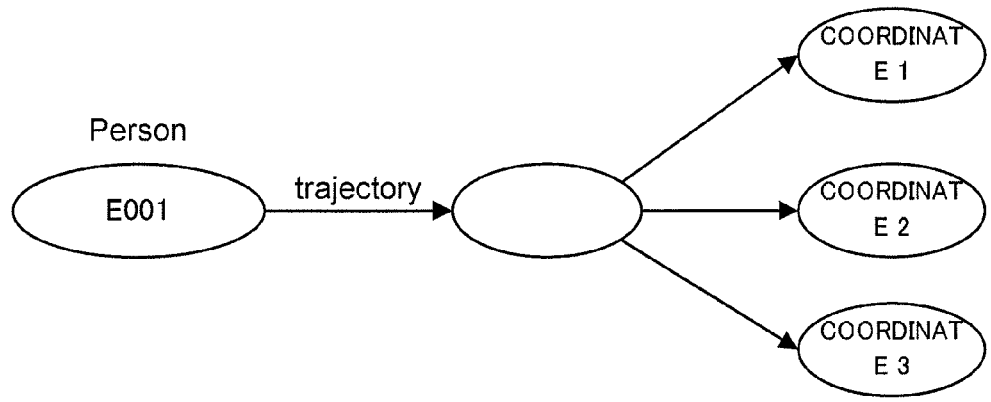
FIG. 14 is a conceptual view showing an example of a model outputted by a person's trajectory search engine.
Figure 15:
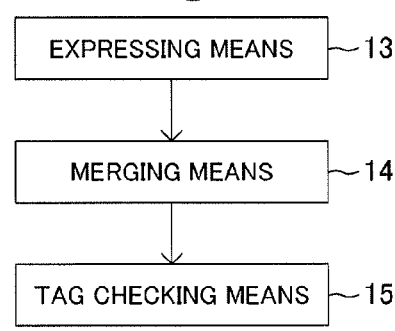
FIG. 15 is a block diagram schematically showing a configuration of a data integration processing system described in Patent Document 1 as a first related art.

Examples of analysis result data respectively outputted by the analyzing means of (1) to (3) are shown in FIGS. 12 to 14. The contents of characteristic information regarding analysis result data outputted by the analyzing means of (1) to (3) are shown in FIGS. 2 to 4.

Further, in this exemplary embodiment, the data integration processing device can execute the integration process in accordance with integration processing methods shown below:

(i) a first integration processing method: a method of executing an integration process of simply integrating inputted two graphs by considering nodes having the same node ID and value as the same nodes; and (ii) a second integration processing method: a method of executing an integration process of, with respect to inputted two graphs, in a case that the values of nodes represented by properties of the same node IDs are inconsistent (different), scanning two inputted models and judging which value to use.

The computation amounts in the integration process will be compared. In the integration processing method (i), there is a need to scan consistency of nodes between two graphs. When the number of nodes is N, the computation amount of $N^2$ is required. On the other hand, in the integration processing method (ii), at the time of integration of properties of target nodes, models are scanned in order to solve inconsistency of inconsistent nodes. Therefore, the computation amount of $N^2 \times N^2$ is required.

The combinations of the analysis result data outputted by the analyzing means (1) to (3) described above and a required level of the required integration function have a relation as described below.

Integration between (1) and (2): when there is a different property, integrate while solving this inconsistency.

Integration between (1) and (3): simply integrate all.

Integration between (2) and (3): simply integrate all.

Further, in the integration processing method selection rule storing means 8, the rules shown in FIG. 5 are set. To be specific, the integration processing method selection rule storing means 8 stores the selection rule table 810 shown in FIG. 5 as the rule information.

Next, a specific operation example will be shown. Upon reception of the analysis result data of the analyzing means (1) and (2) from the analysis processing device 2, the integration processing method selecting means 4 operates in the following manner.

First, the integration processing method selecting means 4 extracts consistent overlap frequency (Person 70%) and inconsistent overlap frequency (e-mail 80%) from the each-analyzing-means characteristic storing means 5 based on analyzing means IDs (in this case, the customer information search engine and the employee information search engine) included in the received analysis result data.

Further, the integration processing method selecting means 4 extracts class/property appearance frequency (Person 33%, e-mail 33%) from the each-analyzing-means characteristic storing means 5 based on the analyzing means IDs included in the received analysis result data.

Next, the integration processing method selecting means 4 judges which rule the extracted frequency information described above matches based on the rule information stored by the integration processing method selection rule storing means 8.

Herein, the integration processing method selecting means 4 judges to match the rule of the rule ID 002 (refer to FIG. 5), and selects the second integration processing method associated with the rule ID 002.

Finally, the integration processing method selecting means 4 outputs an integration processing method ID that specifies the second integration processing method to the integration controlling means. In this case, when there is a different property, the data integration processing device 1 provides a function of integrating while solving this inconsistency. Therefore, the calculation time (the calculation amount) is $N^2 \times N^2$.

Further, upon reception of analysis result data of the analyzing means (1) and (3) from the analysis processing device 2, the integration processing method selecting means 4 operates in the following manner.

First, the integration processing method selecting means 4 extracts consistent overlap frequency (Person 100%) and inconsistent overlap frequency (none) from the each-analyzing-means characteristic storing means 5 based on analyzing means IDs (in this case, the customer information search engine and the person's trajectory search engine) included in the received analysis result data.

Further, the integration processing method selecting means 4 extracts class/property appearance frequency (Person 33%,) from the each-analyzing-means characteristic storing means 5 based on the analyzing means IDs included in the received analysis result data.

Next, the integration processing method selecting means 4 judges which rule the extracted frequency information described above matches based on the rule information stored by the integration processing method selection rule storing means 8.

Herein, the integration processing method selecting means 4 judges to match the rule of the rule ID 001 (refer to FIG. 5), and selects the first integration processing method associated with the rule ID 001.

Finally, the integration processing method selecting means 4 outputs an integration processing method ID that specifies the first integration processing method to the integration controlling means. In this case, the data integration processing device 1 provides a simple ID consistent type integration function. Therefore, the computation time (the computation amount) is $N^2$.

As described above, in this exemplary embodiment, a function defined by (ii) as the integration function is provided, whereas when the function is not required, a function defined by (i) of higher speeds is applied. Accordingly, it is possible to make the throughput of the whole system higher than a system using only (ii).

To be specific, in the case of a system in which a request for integration of analysis results of (1) and (2) is 20% and a request for integration of analysis results of (1) and (3) is 80%, an average processing time is $N^2 \times (0.8 + 0.2 \times N^2)$. Accordingly, the average processing time is shorter than an average processing time ($N^2 \times N^2$) of a system using only (ii).

Thus, the present invention is for increasing a performance of integration of processing result data in a processing infrastructure which integrates a plurality of functions and operates.

Figure 16:
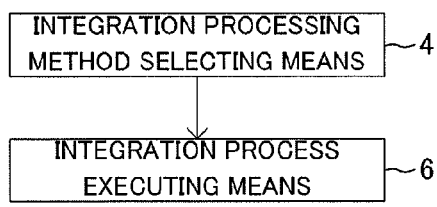
FIG. 16 is a function block diagram showing an example of a minimum configuration of the data integration processing device.

Next, a minimum configuration of the data integration processing device according to the present invention will be described. FIG. 16 is a block diagram showing an example of the minimum configuration of the data integration processing device. As shown in FIG. 16, the data integration processing device includes, as minimum components, the integration processing method selecting means 4 for selecting an integration processing method used for integration of inputted graphs, and the integration process executing means 6 having a plurality of integration processing methods.

In the data integration processing device having the minimum configuration shown in FIG. 16, with respect to each node in the inputted graphs, the integration processing method selecting means 4 selects an integration processing method used for integrating lower nodes in accordance with frequency that the lower nodes are consistent when upper nodes are consistent. Then, the integration process executing means 6 executes an integration process in accordance with the integration processing method selected by the integration processing method selecting means 4 among the plurality of integration processing methods, thereby integrating the plurality of graphs having been inputted.

Therefore, according to the data integration processing device having the minimum configuration, by applying an integration processing method of providing a function required at the time of integration of two graphs, it is possible to increase the throughput of the integration process without limiting functions.

In this exemplary embodiment, characteristic configurations of the data integration processing device as described in (1) to (6) below are shown.

(1) A data integration processing device is a data integration processing device (e.g., realized by the data integration processing device 1) configured to integrate a plurality of graphs (e.g., result data of analysis by the analyzing means of the analysis processing device 2). The data integration processing device includes: an integration processing method selecting means (e.g., realized by the integration processing method selecting means 4) for selecting an integration processing method (e.g., the first integration processing method described in (i), or the like) used for integration of inputted graphs; and an integration process executing means, (e.g., realized by the integration process executing means 6) having a plurality of integration processing methods, for integrating a plurality of graphs by executing an integration process in accordance with an integration processing method selected by the integration processing method selecting means from among the plurality of integration processing methods. The integration processing method selecting means is configured to, with respect to each of nodes in inputted graphs, select an integration processing method used for integrating lower nodes in accordance with frequency that the lower nodes are consistent, when upper nodes are consistent.

(2) In the data integration processing device, the integration processing method selecting means may be configured to, with respect to each of nodes in inputted graphs, select an integration processing method used for integrating lower nodes based on consistent overlap frequency as frequency that the lower nodes are consistent and inconsistent overlap frequency as frequency that the lower nodes exist but are not consistent, when upper nodes are consistent.

(3) In the data integration processing device, the integration process executing means may be configured to be capable of executing an integration process in accordance with a second integration processing method that an integration function is high and a processing speed is low or a first integration processing method that an integration function is low and a processing speed is high, and the integration processing method selecting means may be configured to, with respect to each of nodes in inputted graphs, select the first integration processing method in a case that frequency that lower nodes are consistent is high, and select the second integration processing method in a case that the frequency is low, when upper nodes are consistent.

(3-1) To be specific: the integration process executing means may be configured to be capable of executing an integration process in accordance with a first integration processing method including a predetermined integration function and allowing an integration process at a predetermined processing speed, or in accordance with a second integration processing method including a higher integration function than the first integration processing method but allowing an integration process at a lower processing speed than the first integration processing method; and the integration processing method selecting means may be configured to, with respect to each of nodes in inputted graphs, select the first integration processing method in a case that a value based on frequency that lower nodes are consistent is higher than a predetermined value, and select the second integration processing method in a case that the value based on the frequency is lower than the predetermined value, when upper nodes are consistent.

(3-2) Further, the integration processing method selecting means may be configured to, with respect to each of nodes in the inputted graphs, when upper nodes are consistent, select the first integration processing method in a case that a value based on frequency that lower nodes are consistent is higher than a predetermined value and a value based on frequency that the lower nodes are not consistent is lower than a predetermined value, and select the second integration processing method in a case that the value based on the frequency that the lower nodes are consistent is lower than the predetermined value and the value based on the frequency that the lower nodes are not consistent is higher than the predetermined value.

(4) The data integration processing device may include a graph dividing means (e.g., realized by the graph dividing means 12) for dividing inputted graphs into a plurality of subgraphs. The graph dividing means may be configured to, with respect to each of nodes in inputted graphs, divide the graphs into subgraphs based on frequency that lower nodes are consistent, when upper nodes are consistent; the integration processing method selecting means may be configured to select an integration processing method for each of the subgraphs as a result of division by the graph dividing means; and the integration process executing means may be configured to execute an integration process for each of the subgraphs as the result of the division by the graph dividing means.

(5) The data integration processing device may include an each-analyzing-means characteristic storing means (e.g., realized by the each-analyzing-means characteristic storing means 5) for, with respect to each of nodes in graphs having been previously inputted, storing statistical frequency that lower nodes are consistent in association with each of analyzing means having outputted the graphs, when upper nodes are consistent. The integration processing method selecting means may be configured to extract the statistical frequency from the each-analyzing-means characteristic storing means based on the analyzing means having outputted inputted graphs, and select an integration processing method used for integrating the graphs based on the extracted statistical frequency.

(6) The data integration processing device may include a characteristic learning means (e.g., realized by the characteristic learning means 7) for, with respect to each of nodes in graphs having been previously inputted, calculating statistical frequency that lower nodes are consistent, and storing into the each-analyzing-means characteristic storing means, when upper nodes are consistent. The characteristic learning means may be configured to input information showing each of analyzing means having outputted inputted graphs, calculate statistical frequency based on the inputted information, and sequentially update information stored by the each-analyzing-means characteristic storing means.

The programs in each of the exemplary embodiments are stored in the storage device, or recorded on a computer-readable recording medium. For example, the recording medium is a portable medium such as a flexible disk, an optical disk, a magneto-optical disk, and a semiconductor memory.

Although the present invention has been described with reference to the respective exemplary embodiments, the present invention is not limited to the aforementioned exemplary embodiments. The configurations and details of the present invention may be altered in various manners that can be understood by those skilled in the art within the scope of the present invention.

The present invention is based upon and claims the benefit of priority from Japanese patent application No. 2010-204210, filed on Sep. 13, 2010, the disclosure of which is incorporated herein in its entirety by reference.

INDUSTRIAL APPLICABILITY

The present invention can be applied to use such as a data integration processing device and a program for causing a computer to realize a data integration processing device, for increasing the throughput of an integration process in a processing infrastructure integrating a plurality of graph data.

DESCRIPTION OF REFERENCE NUMERALS

1 data integration processing device
2 analysis processing device
4 integration processing method selecting means
5 each-analyzing-means characteristic storing means
6 integration process executing means
7 characteristic learning means
8 integration processing method selection rule storing means
9 first integration processing method executing means
10 second integration processing method executing means
11 third integration processing method executing means
12 graph dividing means
510 consistent overlap frequency table
520 inconsistent overlap table
530 class property appearance frequency table
810 selection rule table

The invention claimed is:

1. A data integration processing device configured to integrate a plurality of graphs, the data integration processing device comprising a central processing unit (CPU), the CPU comprising:
    integration processing method selecting unit configured to select an integration processing method used for integrating inputted graphs; and
    an integration process executing unit, comprising a plurality of integration processing methods, configured to integrate a plurality of graphs by executing an integration process in accordance with an integration processing method selected by the integration processing method selecting unit from among the plurality of integration processing methods,
    wherein the integration processing method selecting unit is configured to, with respect to each of nodes in inputted graphs, select an integration processing method used for integrating lower nodes in accordance with a frequency that the lower nodes are consistent, when upper nodes are consistent, wherein nodes are consistent when information configuring element data of nodes overlap.

2. The data integration processing device according to claim 1, wherein the integration processing method selecting unit is configured to, with respect to each of nodes in inputted graphs, select an integration processing method configured to integrate lower nodes based on consistent overlap frequency as frequency that the lower nodes are consistent and inconsistent overlap frequency as frequency that the lower nodes exist but are not consistent, when upper nodes are consistent.

3. The data integration processing device according to claim 1, wherein:
    the integration process executing unit is configured to execute an integration process in accordance with a second integration processing method in which an integration processing performance is high and a processing speed is low or a first integration processing method in which an integration function is low and a processing speed is high; and
    the integration processing method selecting unit is configured to, with respect to each of nodes in inputted graphs, select the first integration processing method when the frequency that lower nodes are consistent is high, and select the second integration processing method when the frequency is low, when upper nodes are consistent.

4. The data integration processing device according to claim 1, wherein:

the integration process executing unit is configured to execute an integration process in accordance with a first integration processing method, comprising a predetermined integration function and allowing an integration process at a predetermined processing speed, or in accordance with a second integration processing method, comprising a higher integration processing performance than the first integration processing method but allowing an integration process at a lower processing speed than the first integration processing method; and the integration processing method selecting unit is configured to, with respect to each of nodes in inputted graphs, select the first integration processing method when a value based on the frequency that lower nodes are consistent is higher than a predetermined value, and select the second integration processing method when the value based on the frequency is lower than the predetermined value, when upper nodes are consistent.

5. The data integration processing device according to claim 1, comprising a graph dividing unit for dividing inputted graphs into a plurality of subgraphs, wherein:

the graph dividing unit is configured to, with respect to each of nodes in inputted graphs, divide the graphs into subgraphs based on the frequency that lower nodes are consistent, when upper nodes are consistent;

the integration processing method selecting unit is configured to select an integration processing method for each of the subgraphs as a result of division by the graph dividing unit; and the integration process executing unit is configured to execute an integration process for each of the subgraphs as the result of the division by the graph dividing unit.

6. The data integration processing device according to claim 1, comprising an each-analyzing-unit characteristic storing unit configured to, with respect to each of nodes in previously inputted graphs, store a statistical frequency that lower nodes are consistent in association with each of analyzing units having outputted the graphs, when upper nodes are consistent, wherein the integration processing method selecting unit is configured to extract the statistical frequency from the each-analyzing-unit characteristic storing unit based on the analyzing units which output graphs used at input graphs, and to select an integration processing method used for integrating the inputted graphs based on the extracted statistical frequency.

7. The data integration processing device according to claim 6, comprising a characteristic learning unit for, with respect to each of nodes in previously inputted graphs, calculating a statistical frequency that lower nodes are consistent, and storing the statistical frequency into the each-analyzing-unit characteristic storing unit, when upper nodes are consistent, wherein the characteristic learning unit is configured to input information showing each of analyzing units which output graphs used as input graphs, calculate a statistical frequency based on the inputted information, and sequentially update information stored by the each-analyzing-unit characteristic storing unit.

8. The data integration processing device according to claim 1, wherein the element data corresponds to a class of a node of graph data or a property name.

9. A data integration processing method for integrating a plurality of graphs, the data integration processing method comprising:

selecting an integration processing method used for integrating inputted graphs;

implementing a plurality of integration processing methods and integrating a plurality of graphs by executing an integration process in accordance with an integration processing method selected from among the plurality of integration processing methods; and at the time of selecting an integration processing method, with respect to each of nodes in inputted graphs, selecting an integration processing method used for integrating lower nodes in accordance with a frequency that the lower nodes are consistent, when upper nodes are consistent, wherein nodes are consistent when information configuring element data of nodes overlap.

10. A non-transitory computer-readable storage medium storing a data integration processing program for integrating a plurality of graphs, the data integration processing program comprising instructions for causing a computer to execute:

an integration processing method selecting process for selecting an integration processing method used for integrating inputted graphs; and an integration process executing process, comprising a plurality of integration processing methods, configured to integrate a plurality of graphs by executing an integration process in accordance with an integration processing method selected from among the plurality of integration processing methods, and the data integration processing program comprising instructions for causing the computer to, in the integration processing method selecting process, execute a process for, with respect to each of nodes in inputted graphs, selecting an integration processing method used for integrating lower nodes in accordance with a frequency that the lower nodes are consistent, when upper nodes are consistent, wherein nodes are consistent when information configuring element data of nodes overlap.

* * * * *